Figure 1:
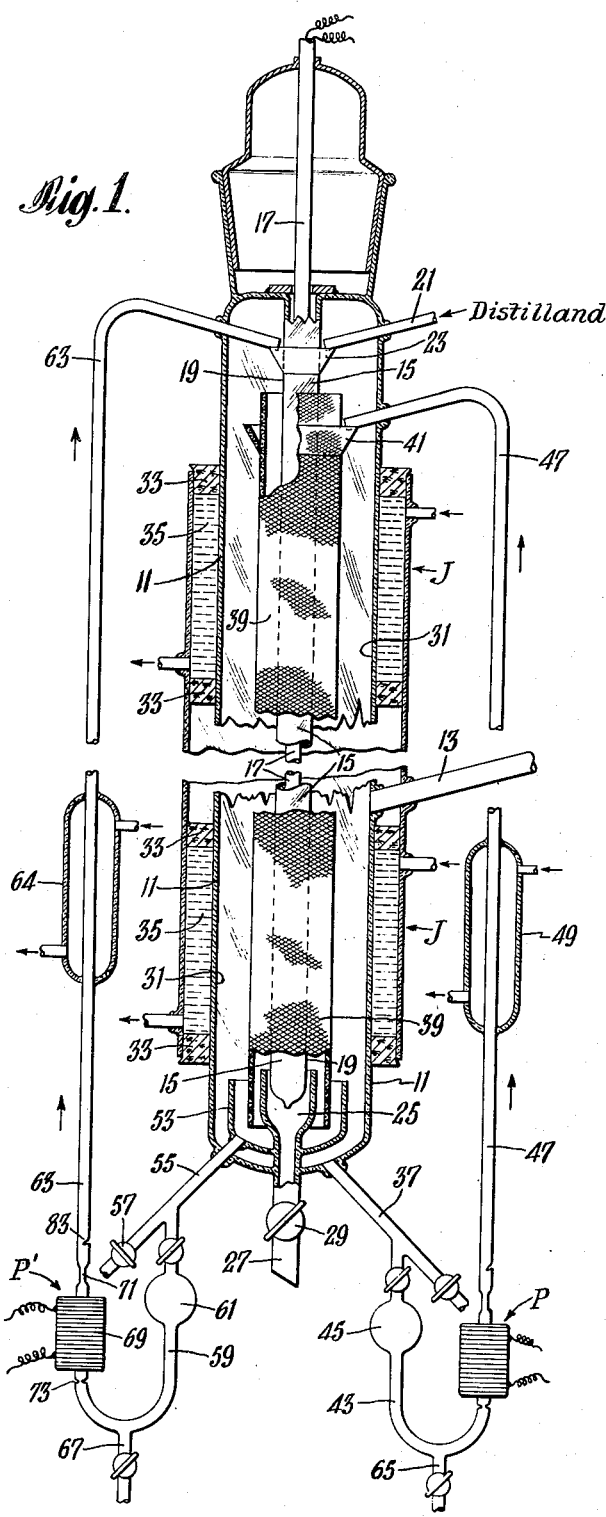

Feb. 9, 1943.　　　H. L. COX ET AL　　　2,310,399
DISTILLATION PROCESS AND APPARATUS
Filed Sept. 10, 1940

INVENTORS
HENRY L. COX
ARGYLE C. PLEWES
BY
ATTORNEY

Patented Feb. 9, 1943

2,310,399

UNITED STATES PATENT OFFICE 2,310,399

DISTILLATION PROCESS AND APPARATUS

Henry L. Cox and Argyle C. Plewes, South Charleston, W. Va., assignors to Carbide and Carbon Chemicals Corporation, a corporation of New York Application September 10, 1940, Serial No. 356,156

15 Claims. (Cl. 202—52)

This invention relates to high vacuum distillation with rectification of the resultant vapors. More particularly it concerns a novel process and apparatus for high vacuum distillation wherein the primary distillation surface and an associated condensing surface are adjacent each other and are separated by unobstructed space. The invention has especial utility in connection with the high vacuum, short path or molecular type of distillation wherein a condensing surface is positioned at a distance from the evaporating surface of the order of the mean free path of the vaporized molecule. Absolute pressures of below 1 mm. of mercury conveniently are used.

Apparatus is known for conducting high vacuum short path or molecular distillation processes wherein a perforated or grid condenser is used as a primary condensing surface, which grid may be maintained warm so that only the more volatile constituents of the vaporized material pass the grid into an outer vacuum space where the same may be condensed separately, thereby effecting a partial fractionation or fractional condensation of the vapors and a certain degree of separation of a selected constituents somewhat greater than that obtained in a single operation of a simple molecular still. The use of a number of such grid condensers, with a suitable regulation of the temperature of each, permits some increase in the number of fractions segregated. Each fraction of condensate thus secured, however, still contains substantial amounts of the lower-boiling constituents of the distilland, the removal of which by procedures available heretofore has necessitated redistillation, and has presented practical difficulties.

The present invention is based in important part upon the discovery that, by utilizing as a primary condensing surface a foraminous member or gauze of suitably fine mesh, spaced from the primary vaporizing surface a distance less than the mean molecular path of the vapor molecules, and located between said primary vaporizing surface and a secondary or final condensing surface, and by continuously recycling over said foraminous member a portion of the condensate from the final condensing surface, disposed in a thin film along a moving path maintained uniformly spaced from said primary vaporizing surface a distance of the order of the mean free path of the vaporized molecules, rectification of the vapors leaving the vaporizing surface occurs, and a very much better separation from the substance being distilled of the low-boiling constituent is secured than is possible by simple molecular distillation.

Among the more important objects of the invention are: To provide, in novel manner, in a high vacuum, short path or molecular type of distillation process, for rectifying vapors passing to a condensing surface, by means of a primary condensate previously formed at said condensing surface; and to provide a novel, compact and efficient apparatus for effecting high vacuum short-path distillations with rectification of the distilled vapors. These and other objects will be apparent from the following description and the accompanying drawing.

Figure 2:
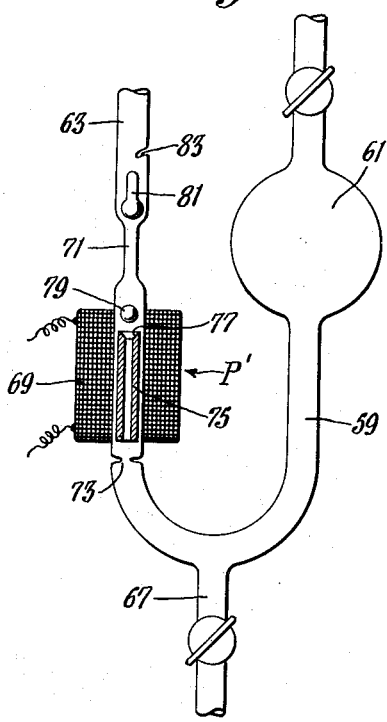

In the drawing, illustrating somewhat diagrammatically one embodiment of the invention, Fig. 1 is a vertical section of a still, showing, somewhat diagrammatically, certain associated parts, portions being broken away; and Fig. 2 is an enlarged fragmentary view of one form of magnetic pump and associated parts, portions being shown in section.

Referring to the drawing, numeral 11 designates a hollow cylindrical casing or column provided with an integral evacuating conduit 13 which leads to vacuum pumps (not shown). A tubular metal heat transfer member 15 has its upper end welded or otherwise secured to casing 11 so as to provide a vacuum-tight seal, and has its lower end closed. Member 15 houses an electrical heating element 17 immersed in an oil medium (not shown) for supplying uniformly to the outer surface 19 of member 15 the heat requisite for vaporizing liquid flowing downward along that surface. Other heating means may be substituted for the electrical element.

For feeding the liquid to be distilled to the upper portion of the outer surface 19 of the heat transfer member 15 or primary vaporizing surface, a conduit 21 leads from a source of distilland supply and discharges the liquid within a tapered annular foraminous distributing member 23 which is secured to member 15. Preferably the liquid is degassed prior to being fed to member 23, as by being subjected to high vacuum while at an elevated temperature. The liquid is thus evenly dispersed over the heated outer surface 19 of member 15 and flows downwardly thereover by gravity in a thin film. Any undistilled residue flows from the lower end of the vaporizing surface 19 into a trap or reservoir 25, from which it is withdrawn, either continuously or intermittently, through conduit 27, provided with valve 29, to storage receivers (not shown).

For maintaining the inner or condensing surface 31 of the wall of the column 11 at a selected temperature lower than that of the vaporizing surface 19, a heat transfer jacket J surrounds column 11. A plurality of annular members 33 divide the jacket J into a plurality of chambers 35, each having an inlet and an outlet for a cooling fluid.

For removing and collecting condensate formed on the inner wall or condensing surface 31 of casing 11, a valve-controlled conduit 37 connects the lower end of casing 11 with a primary distillate or condensate receiver (not shown).

For rectifying the distilled vapors formed on the vaporizing surface 19, while avoiding the necessity of exposing the same repeatedly to the temperature existing at the aforesaid surface, a tubular screen 39 of copper gauze or other suitable material is secured within casing 11, and has its lateral surfaces disposed intermediate the vaporizing surface 19 and the condensing surface 31. The fine mesh screen or gauze 39 preferably is so designed and disposed that the distances between it and the respective vaporizing surface 19 and condensing surface 31 are less than the mean free path of the vaporized molecules, thereby keeping the rate of distillation at a maximum.

The screen 39 is of sufficiently fine mesh to provide an adequate barrier for the fast moving particles of vapor from vaporizing surface 19. The resultant collision between the vapor particles with the thin film of liquid flowing along the strands of the screen effects a partial condensation of the vapor and a simultaneous vaporization of low-boiling components of the reflux liquid. The use of copper screens of 60 mesh has given excellent results, although screens of smaller and of larger mesh may conveniently be used. It is highly desirable that the screen or other foraminous member be supported in manner to prevent interference with the free flow of reflux liquid over the same. Thus, when using a screen, the latter is so constructed that the wires of the screen are disposed at an acute angle with respect to the direction of flow of reflux liquid along the screen, as shown in Fig. 1. This arrangement serves to make the screen self-clearing, and to insure the uniform distribution of reflux liquid on the screen at all times.

A selected portion or all of the distillate or primary condensate collected at the base of the condensing surface 31 is fed to a foraminous cup or channel 41 formed at the upper margin of the screen 39, through a conduit 43 having therein a reservoir 45, and a liquid conduit 47 of non-magnetic material, by means of a magnetic pump P. Details of such a pump are shown in Fig. 2. The liquid is forced by pump P to the upper part of the screen, and is dispersed over the outer periphery of the latter and flows in a thin film downwardly thereon, thus wetting the gauze and offering a partial barrier for the fast moving vapor particles from surface 19. Collisions of the vapor particles with the recycled liquid condensate cause a heat exchange, and a partial condensation of the higher-boiling components of the vapor particles, and, concurrently, a partial revaporization at the surface of the gauze of the lower-boiling components of the cycled liquid or reflux. The resultant vapors move toward condensing surface 31 and are condensed. A selected part or all thereof may flow thence through conduit 37 to the primary condensate receiver, the balance of this primary condensate being recycled as a reflux through conduits 43, 47.

For reheating the recycled liquid flowing to the gauze or screen 39, when desired, a suitable heat exchanger, such as a steam jacket 49 or an electrical heating element, may surround a portion of conduit 47. At least the major portion of the screen preferably is maintained at a temperature above that of condensing surface 31. The portions of the cycled condensate which are not vaporized during downward flow along the screen 39 are collected in the cup 53 below the screen, and thence flow through a conduit 55 controlled by valve 57 to an intermediate condensate reservoir (not shown). A selected portion of the liquid reaching cup 53 from the screen may be withdrawn and fed to the distributing member 23 through a valve-controlled conduit 59, reservoir 61, and a conduit 63 of non-magnetic material having therein a magnetic pump P′ similar to pump P. A heat exchanger, such as one having a heating jacket 64 for steam or other hot fluid, or an electrical heating element, may surround a portion of conduit 63 for reheating the cycle liquid flowing through the latter. Thus, portions of the higher-boiling components of the original distilland, together with higher-boiling components of the cycled primary condensate, may be redistilled at the higher temperature of the initial vaporizing surface 19. The liquid flowing to cup 53 from screen 39 may be designated as an intermediate condensate, or as a secondary distillate. The valve-controlled conduits 65, 67 permit withdrawing liquid from conduits 43, 59, when desired.

Magnetic pumps P, P′ are of well-known construction, and are similar. Therefore only pump P′ will be described in detail. Pumps of this type are described in "Dunoyer's Vacuum Practice" (1926), page 38 thereof. Referring to Fig. 2, the pump P′ embodies an electromagnetic coil 69 surrounding a portion of the wall of conduit 63 between constrictions 71 and 73 therein. A hollow magnetic core 75 is loosely housed in the conduit 63 between the said constrictions, and has a tapered upper valve seating surface 77 cooperating with a floating valve 79 of non-magnetic material. The latter is freely movable in conduit 63 between core 75 and constriction 71. A floating valve element 81 is freely movable in conduit 63 between constriction 71 and a constriction 83. The manner of operation of the magnetic pump is believed obvious. Rapid reversal of the flow of current through coil 69 causes reciprocation of core 75 which functions like the piston of a pump in association with valves 79 and 81 and the corresponding seating surfaces.

It will be understood that the foregoing description is merely illustratory of the invention, and that various modifications of the invention may be employed. Thus, two or more concentric screens may be interposed between the main vaporizing surface 19 and the principal condensing surface 31, in which case a selected portion of the liquid flowing from each screen may be returned to the upper part of the next adjacent screen in the direction toward the main vaporizing surface 19.

In the practice of the invention it will be clear that vapors formed at surface 19 which reach the condensing surface 31 through screen 39 are condensed and returned to the screen, and form a partial barrier to the mixture of vapors moving from surface 19. Contact of the said vapors with this thin film of liquid reflux causes a partial condensation from said vapors of materials richer in the higher-boiling components. Simultaneously a portion of the lower-boiling components of the liquid reflux is vaporized at and adjacent the screen and is drawn outwardly therefrom, together with low-boiling components of the vapors generated at the vaporizing surface 19, that have passed through the screen uncondensed— finally reaching condensing surface 31, where they are condensed. Thus enrichment of the primary condensate in the lower-boiling component of the distilland is accomplished in one simple step. Furthermore, by recycling the liquid flowing from the lower end of screen 39, an intermediate distillate or condensate is secured which is much freer from high-boiling ends and undistilled material than otherwise would be possible in a simple distillation.

The following example of the invention is intended solely for purposes of illustration. While maintaining a high vacuum of 0.003 mm. of mercury, absolute pressure, within a vacuum distillation apparatus similar to that shown in the drawing, a mixture of diethylene glycol and triethylene glycol containing 50% of each, was introduced into inlet line 21, while maintaining the vaporizing surface 19 at substantially 110° C., and the condensing surface 31 at 30° C. A reflux ratio of 1:1 was used. That is, half of the distillate collected at the condensing surface 31 was conducted to screen 39 in the manner described. Under these conditions the primary condensate secured from surface 31 was over 17% richer in the low-boiling component than the primary condensate secured under similar conditions but without reflux.

In a similar operation, a mixture of 53% of tetraethylene glycol and 47% dibutyl phthalate was distilled in apparatus of the type hereinbefore described, under a vacuum of 0.003 mm. of mercury, absolute pressure. The respective vaporizing and condensing surfaces were maintained, respectively, at 125° C., and at 30° C. The primary condensate was refluxed through conduit 41, using a reflux ratio of 1:1. Employing a feed rate of around 125 cc. of distilland per square inch of primary vaporizing surface per hour, a primary distillate was secured which was very materially richer in the lower-boiling constituent than in a somewhat similar operation in which the reflux principle of this invention was not utilized.

It will be apparent that the temperatures at which the vaporizing and condensing surfaces are maintained will vary widely, dependent upon such factors as the boiling points and other physical properties of the components of the distilland, the degree of vacuum used, and the reflux ratio used. Thus, frequently viscous high-boiling distillates require the use of cooling water maintained at 80° or 100° C.

By the practice of the present invention it is possible to secure, in connection with distillation operations of the molecular type, in one distillation step, and with simple distillation apparatus, one or more condensates that are greatly enriched in the lower-boiling components, without the need for separate cooling and subsequent vaporization steps otherwise required to effect such a result when utilizing processes involving the partial or fractional condensation of the various components of mixtures containing the same.

The invention is susceptible of modification within the scope of the appended claims.

We claim:

1. Vacuum distillation apparatus comprising a vacuum-tight chamber having therein a primary vaporizing surface and a primary condensing surface in closely spaced relation, and having a foraminous surface disposed between said vaporizing surface and said condensing surface; means for feeding distilland to said vaporizing surface; means for withdrawing distillate from said condensing surface and for distributing a selected portion thereof upon said foraminous surface; and means for removing residual gases from said chamber, and for maintaining a vacuum therein.

2. Vacuum distillation apparatus comprising, in combination, within a substantially closed chamber, a vaporizing surface and a condensing surface in closely spaced relation; means for heating said vaporizing surface; means for cooling said condensing surface; means for introducing distilland onto said vaporizing surface; means for removing undistilled residue from said vaporizing surface; a foraminous member disposed between and spaced from said vaporizing and said condensing surfaces; means for distributing a selected portion of a liquid condensate from said condensing surface upon the said foraminous member; means for withdrawing the remaining portion of said liquid condensate from said chamber; and evacuating means for removing residual gases from said chamber.

3. Vacuum distillation apparatus comprising, in combination, within a closed chamber, a vaporizing surface and a condensing surface in closely spaced relation; means for heating said vaporizing surface; means for cooling said condensing surface; a foraminous member disposed between and spaced from said vaporizing and condensing surfaces; said member and surfaces being so disposed as to provide a short unobstructed path between said member and each of said vaporizing and condensing surfaces; means for withdrawing liquid condensate from said condensing surface and for distributing a selected portion of said condensate upon said foraminous member; means for introducing distilland upon said vaporizing surface; and evacuating means for removing residual gases from said chamber.

4. Apparatus as defined in claim 3, together with means for withdrawing unvaporized liquid from said foraminous member and for conducting a selected portion thereof to said vaporizing surface.

5. Apparatus as defined in claim 3, wherein said foraminous member is a fine-mesh metal gauze.

6. Vacuum distillation apparatus comprising, in combination, a vaporizing surface and a condensing surface in closely spaced relation within a substantially closed chamber; means for heating said vaporizing surface; means for cooling said condensing surface; means for introducing distilland upon said vaporizing surface in a thin film; means for removing undistilled residue from said vaporizing surface; a foraminous member disposed between and spaced from said vaporizing and said condensing surfaces; means for feeding a selected portion of a liquid condensate from said condensing surface to and for distributing such condensate uniformly upon said foraminous member; means for withdrawing the remainder of said liquid condensate from said chamber; and evacuating means for maintaining a high vacuum in said chamber and for removing residual gases from the latter.

7. Vacuum distillation apparatus as defined in claim 6, wherein said foraminous member is a fine mesh woven metal screen having the individual wires composing it disposed at an acute angle relative to the direction of flow of reflux liquid along the same.

8. Vacuum distillation apparatus comprising, in combination, within a closed chamber, a vaporizing surface and a condensing surface in closely spaced relation; means for heating said vaporizing surface; means for cooling said condensing surface; means for introducing upon said vaporizing surface a liquid to be distilled; a foraminous member disposed between the respective vaporizing and condensing surfaces and separated from each of said surfaces by substantially unobstructed space; means for withdrawing condensate from said condensing surface; means for distributing upon said foraminous member a selected portion of the condensate thus withdrawn; and means for removing residual gases from said chamber and for maintaining a high vacuum therein.

9. Vacuum distillation apparatus comprising, in combination, within a substantially closed chamber, a substantially vertical vaporizing surface and a substantially vertical condensing surface in closely spaced relation; means for heating said vaporizing surface; means for cooling said condensing surface; means for introducing distilland onto said vaporizing surface; means for removing undistilled residue from said vaporizing surface; a substantially vertical foraminous member disposed between and spaced from said vaporizing and said condensing surfaces; means for distributing a selected portion of a liquid condensate from said condensing surface upon the upper margin of said foraminous member; means for withdrawing the remaining portion of said liquid condensate from said chamber; means for conducting to said vaporizing surface a selected portion of the liquid flowing from the lower margin of said foraminous member; means for withdrawing the remainder of said last-named liquid from said chamber; and evacuating means for removing residual gases from said chamber.

10. Vacuum distillation apparatus comprising, in combination, within a closed chamber, a substantially vertical vaporizing surface and a substantially vertical condensing surface in closely spaced relation; means for heating said vaporizing surface; means for cooling said condensing surface; means for introducing distilland upon said vaporizing surface; means for removing undistilled residue from said vaporizing surface; a substantially vertical foraminous member disposed between and spaced from said vaporizing and condensing surfaces and providing short unobstructed paths between said member and each of said surfaces; means for withdrawing from said condensing surface liquid condensate and for distributing at least a selected portion of the latter upon the upper margin of said foraminous member; means for withdrawing the residual portion of said liquid condensate from said chamber; and means for removing residual gases from said chamber and for maintaining a high vacuum therein.

11. Vacuum distillation apparatus comprising, in combination, within a closed vacuum-tight chamber, a substantially vertical vaporizing surface and a substantially vertical condensing surface in closely spaced relation; means for heating said vaporizing surface; means for cooling said condensing surface; means for introducing distilland onto said vaporizing surface; means for removing undistilled residue from said vaporizing surface; a substantially vertical foraminous member disposed between and spaced from said vaporizing and condensing surfaces, and permeable to distilled vapors formed at said vaporizing surface; means for heating a selected portion of a liquid condensate formed at said condensing surface; means for distributing said heated portion upon the upper margin of said foraminous member; means for withdrawing the remaining portion of said liquid condensate from said chamber; and means for removing residual gases from said chamber, and for maintaining a vacuum in said chamber.

12. Process for short path high vacuum distillation, which comprises passing over a heated vaporizing surface maintained under a high vacuum fluid organic material readily decomposable by heat, condensing upon a foraminous condensing surface a portion of the organic material thus vaporized, said foraminous surface being disposed near the vaporizing surface but separated from the latter by substantially free unobstructed space, and permitting free flow of permanent gases therethrough, condensing a second portion of said vaporized material upon a second condensing surface maintained at a lower temperature than the first-named condensing surface and spaced from the latter on the side thereof remote from said vaporizing surface, distributing upon said foraminous condensing surface a selected portion of the condensate formed on said second condensing surface, and conducting each of the said steps in the presence of a high vacuum.

13. Process for short path high vacuum distillation, which comprises passing over a heated vaporizing surface maintained under a high vacuum fluid organic material readily decomposable by heat, condensing upon a foraminous condensing surface a portion of the organic material thus vaporized, said foraminous surface being disposed near the vaporizing surface but separated from the latter by substantially free unobstructed space, and permitting free flow of permanent gases therethrough, condensing a second portion of said vaporized material upon a second condensing surface maintained at a lower temperature than the first-named condensing surface and spaced from the latter on the side thereof remote from said vaporizing surface, heating a selected portion of the condensate formed on said second condensing surface, distributing said heated portion of the condensate upon said foraminous condensing surface, and recovering the remainder of the condensate formed on said second condensing surface, and conducting each of said steps in the presence of a high vacuum.

14. Process for short path high vacuum distillation, which comprises passing over a heated vaporizing surface maintained under a high vacuum fluid organic material readily decomposable by heat, condensing upon a foraminous condensing surface a portion of the organic material thus vaporized, said foraminous surface being disposed near the vaporizing surface but separated from the latter by substantially free unobstructed space, and permitting free flow of permanent gases therethrough, condensing a second portion of said vaporized material upon a second condensing surface maintained at a lower temperature than the first-named condensing surface and spaced from the latter on the side thereof remote from said vaporizing surface, distributing upon said foraminous condensing surface a selected portion of the condensate formed on said second condensing surface, isolating and recovering the remainder of said last-named condensate, and conducting each of the said steps in the presence of a high vacuum.

15. Process for short path high vacuum distillation, which comprises passing over a heated vaporizing surface maintained under a high vacuum fluid organic material readily decomposable by heat, condensing upon a foraminous condensing surface a portion of the organic material thus vaporized, said foraminous surface being disposed near the vaporizing surface but separated from the latter by substantially free unobstructed space, and permitting free flow of permanent gases therethrough, condensing a second portion of said vaporized material upon a second condensing surface maintained at a lower temperature than the first-named condensing surface and spaced from the latter on the side thereof remote from said vaporizing surface, distributing upon said foraminous condensing surface a selected portion of the condensate formed on said second condensing surface, isolating and recovering the remainder of the last-named condensate, withdrawing unvaporized liquid from said foraminous condensing surface, distributing a selected portion of the last-named liquid upon said vaporizing surface, and isolating and recovering the remainder of said last-named liquid.

HENRY L. COX.
ARGYLE C. PLEWES.